Figure 1:
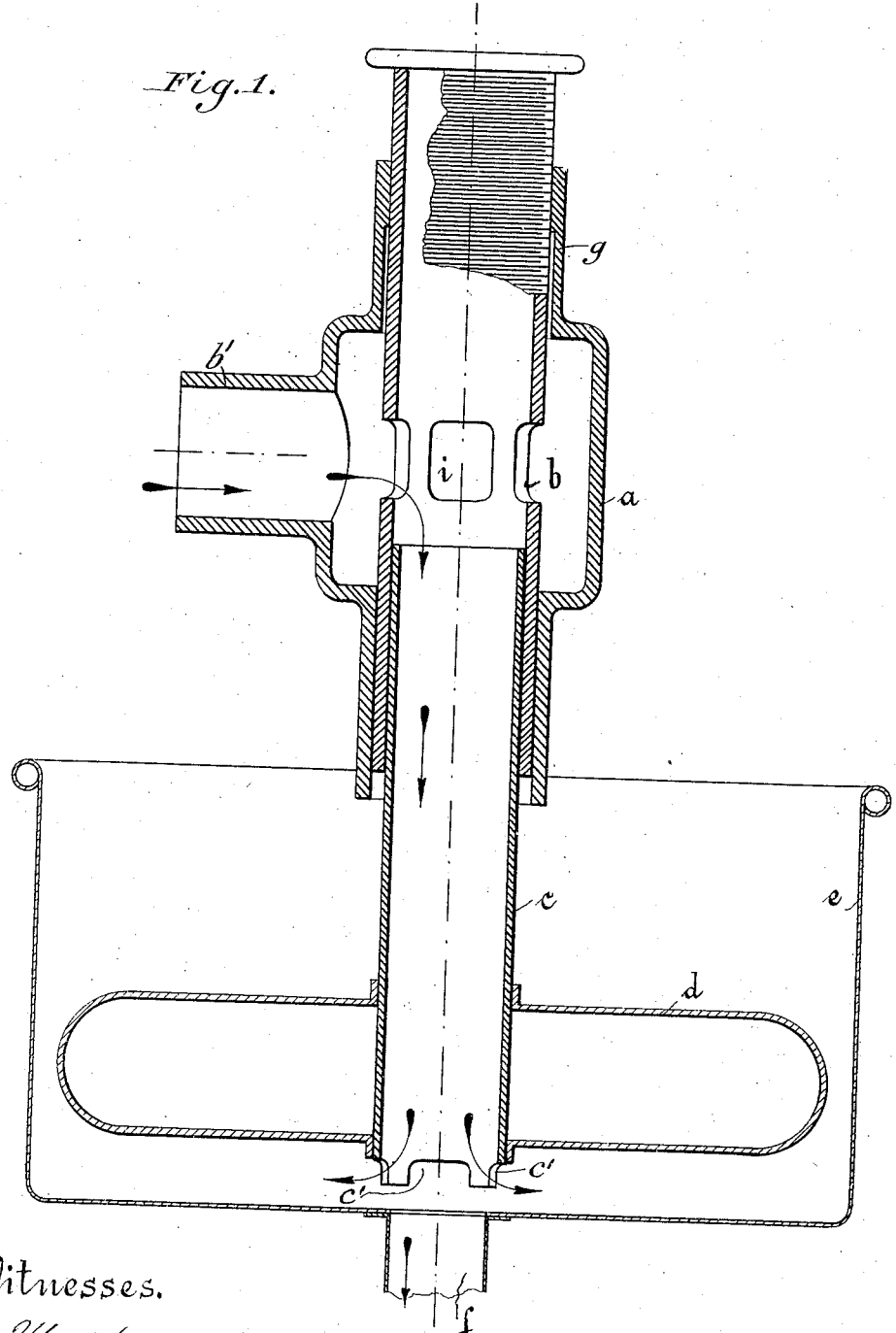

No. 857,703. PATENTED JUNE 25, 1907.
J. WILLMANN.
FLOAT.
APPLICATION FILED OCT. 29, 1903.

2 SHEETS—SHEET 1.

Witnesses.

Inventor.
J. Willmann.

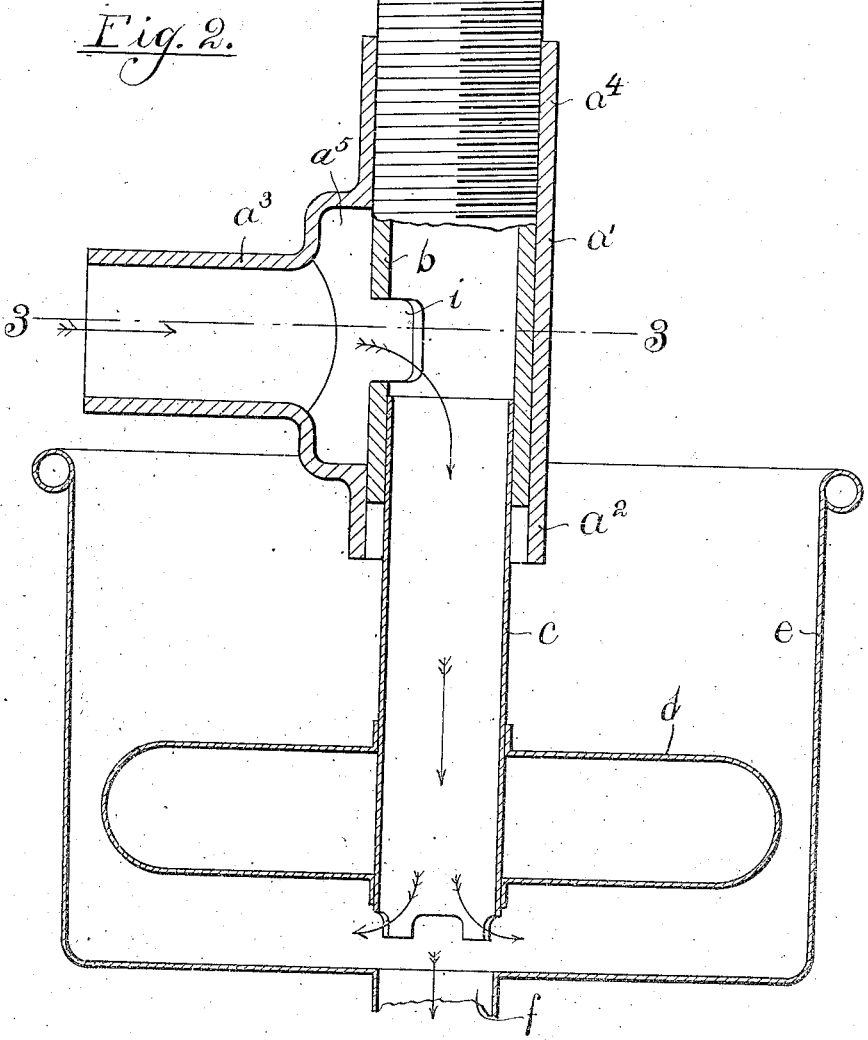

UNITED STATES PATENT OFFICE.

JOSEPH WILLMANN, OF ROME, NEW YORK.

FLOAT.

No. 857,703.     Specification of Letters Patent.     Patented June 25, 1907.

Application filed October 29, 1903. Serial No. 179,027.

*To all whom it may concern:*

Be it known that I, JOSEPH WILLMANN, a subject of the Emperor of Germany, residing at Rome, New York, have invented certain new and useful Improvements in Floats, of which the following is a specification, reference being had therein to the accompanying drawing.

My invention relates to a novel construction in automatically operating feed regulating device for centrifugal separators, the object being to provide a simple and efficient device of this character which is capable of fine adjustment by the operator and which further efficiently regulates the feed automatically to prevent any overflow of liquid, and consists in the features of construction and combinations of parts hereinafter fully described and claimed.

In the accompanying drawings illustrating my invention: Figure 1 is a central vertical section of the feed-bowl of a centrifugal separator provided with feed regulating devices constructed in accordance with my invention. Fig. 2 is a similar view showing a modified form of construction. Fig. 3 is a horizontal section on the line 3—3 of Fig. 2.

My said invention has for its main object to provide means whereby the feed to a centrifugal separator may be maintained relatively uniform by means actuated by the variations in level of the liquid in the feed bowl due to relative variations in feed and consumption of such liquid, and includes means whereby the feed may be primarily adjusted by the operator to accord as nearly as possible with the rapidity of consumption.

A further important object of the invention is to provide feed regulating means which will prevent foaming of the liquid before its admission to the separator.

To these and other ends my said invention consists of a valve-casing $a$ substantially cylindrical in form and provided at its upper and lower ends with concentric hollow stems, the upper stem $g$ being internally threaded. Passing through said stems and said valve-casing is a tube $b$ which is externally threaded and closed at its upper end, and provided between its ends with openings $i$, through which milk entering said chamber $a$ through the inlet $b'$ passes into said tube $b$. The latter is open at its lower end, and telescopically receives the tubular hollow stem $c$ of a float $d$ which is adapted to be supported and raised and lowered by milk entering the feed bowl $e$ of the separator through said tube $c$, the latter being provided in its lower end with recesses $c'$ through which milk may flow laterally into said bowl $e$ when said tube rests on the bottom thereof. Said tube $c$ is of larger diameter than the outlet $f$ of the bowl $e$ so as to enable milk to be fed with sufficient rapidity to maintain the said bowl partially filled. The said tube $b$ is vertically adjustable in said casing $a$ and said tube $c$ is telescopically movable within said tube $b$ and when raised by the float acts as a valve to partially or entirely shut off the flow of milk through said openings $i$, the degree of closure of the latter being dependent upon the position of said tube $b$ in the casing $a$ and upon the level of milk in said bowl $e$.

In Figs. 2 and 3 I have illustrated a modified form of construction of my device in which the valve casing $a'$ corresponds in diameter with the hollow-stems $a^2$ and $a^4$ and is semi-cylindrically enlarged at its inlet end as at $a^5$, which communicates with the inlet pipe $a^3$. The remaining parts accord in construction with similar parts shown in Fig. 1 and previously described, the only essential point of difference being that the tube $b$ has but one opening $i$ and this may be partially or entirely closed by turning said tube $b$ in either direction in an obvious manner. This enables the operator to regulate the flow more rapidly, if desired, than would be possible with the construction shown in Fig. 1.

By means of my device I am enabled to maintain the flow to the feed-bowl normally greater than the exhaust from the latter and thus prevent breaks in the feed and consequent agitation of the milk in passage where it is exposed to the air, and I thus prevent foaming of the milk, prevention of which is very desirable to insure greatest efficiency of the separator.

I claim as my invention:

1. In a liquid separator, a vertically disposed tubular member having connection between its ends with a source of supply of liquid, a member telescopically disposed within said tubular member and adjustable therein, there being openings in said second member adapted to communicate with said source of supply and coacting with the walls of said first-named member to control said connection with said source of supply, a tube open at its ends and telescopically movable within said second member, and a float disposed on said tube at its lower end, adapted to lie within the feed bowl of the separator and be actuated by variations in the level of liquid therein to reciprocate said tube and control the supply of liquid through said openings.

2. In a liquid separator, a vertically disposed tubular member enlarged between its ends and having connection at said enlarged portion, with a source of supply of liquid, a member telescopically disposed within said tubular member and adjustable therein, there being openings in said second member adapted to communicate with said source of supply and coacting with the walls of said first-named member to control said connection with said source of supply, a tube open at its ends and telescopically movable within said second member, and a float disposed on said tube at its lower end, adapted to lie within the feedbowl of the separator and be actuated by variations in the level of liquid therein to reciprocate said tube and control the supply of liquid through said openings.

3. In a liquid separator, a fixed vertically disposed tubular member enlarged between its ends and connected at said enlarged portion with a source of supply of liquid, a tube disposed telescopically within said tubular member and vertically adjustable therein, said tube being closed at its upper end and provided between its ends with openings communicating with said enlarged portion of said tubular member, a tube open at both ends telescopically movable in said first-named tube and adapted to control the openings therein, and a float carried by said last-named tube and adapted to be actuated by variations in the level of liquid in the feed bowl of the separator to impart movement to said last-named tube to regulate the supply of liquid through the openings in said first-named tube.

4. In a liquid separator, the combination with a substantially T-shaped member having three substantially cylindrical arms one of which is horizontally disposed and connected with the source of supply of the liquid to be separated, of a hollow cylindrical member disposed telescopically and vertically adjustable within the vertical arms of said T-shaped members and having an opening between its ends through which the liquid passes, a feed-bowl disposed below said T-shaped member and having connection with the separating means, a vertically disposed feed pipe movable telescopically within said hollow cylindrical member at its upper end and constituting a valve controlling said opening therein and projecting into said feed-bowl at its lower end, and a float carried by said feed pipe and disposed within said feed-bowl, said float being adapted to be actuated by variations in the level of the liquid in said feed-bowl to impart vertical movement to said feed pipe to regulate the flow of liquid.

In testimony that I claim the foregoing as my invention I have signed my name in presence of two subscribing witnesses.

J. WILLMANN.

Witnesses:
  H. MONEHONNE,
  ARTHUR WHITE.